United States Patent
Karandikar

(10) Patent No.: US 8,688,365 B2
(45) Date of Patent: Apr. 1, 2014

(54) METHOD AND SYSTEM FOR DETECTION OF MOTOR VEHICLE MOVEMENT TO AVOID COLLISIONS

(75) Inventor: Praveen Karandikar, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 192 days.

(21) Appl. No.: 13/352,521

(22) Filed: Jan. 18, 2012

(65) Prior Publication Data
US 2013/0184979 A1    Jul. 18, 2013

(51) Int. Cl.
G08G 1/16 (2006.01)
G06F 19/00 (2011.01)

(52) U.S. Cl.
USPC .............................. 701/301; 701/36; 340/435

(58) Field of Classification Search
USPC ............. 701/301, 300, 36, 96; 340/904, 435, 340/436, 438, 439, 932.2
See application file for complete search history.

(56) References Cited

U.S. PATENT DOCUMENTS

| 4,698,571 | A | 10/1987 | Mizuta et al. |
| 5,598,164 | A * | 1/1997 | Reppas et al. ................. 342/70 |
| 6,909,968 | B2 | 6/2005 | Yokota |
| 2006/0244313 | A1 | 11/2006 | Sullivan |
| 2008/0009990 | A1* | 1/2008 | Katoh et al. .................... 701/36 |
| 2008/0023247 | A1 | 1/2008 | Hill |
| 2009/0030611 | A1 | 1/2009 | Chen |
| 2009/0085771 | A1 | 4/2009 | Wu et al. |
| 2012/0025964 | A1* | 2/2012 | Beggs et al. ................. 340/435 |
| 2013/0110342 | A1* | 5/2013 | Wuttke et al. .................. 701/23 |

* cited by examiner

*Primary Examiner* — Tan Q Nguyen
(74) *Attorney, Agent, or Firm* — David A. Mims, Jr.; David Walker

(57) ABSTRACT

A method and system prevents accidental direction selection in a motor vehicle. The driver of the vehicle is alerted that the selected direction of the vehicle via the gear shift is opposite of the direction that the driver intends for the vehicle to move. The selected direction of the vehicle by the driver is initially detected. The invention then detects the driver's physical position and any objects in the immediate area surrounding the vehicle. Based on the information gathered from these detections, there is determination made regarding the vehicle direction selected by the driver. If the determination is the likelihood of an accident/collision if the vehicle moves in the selected direction, the present invention will alert the driver. In addition, an embodiment of the present invention may also include the ability to disable the vehicle in order to avoid a collision.

17 Claims, 6 Drawing Sheets

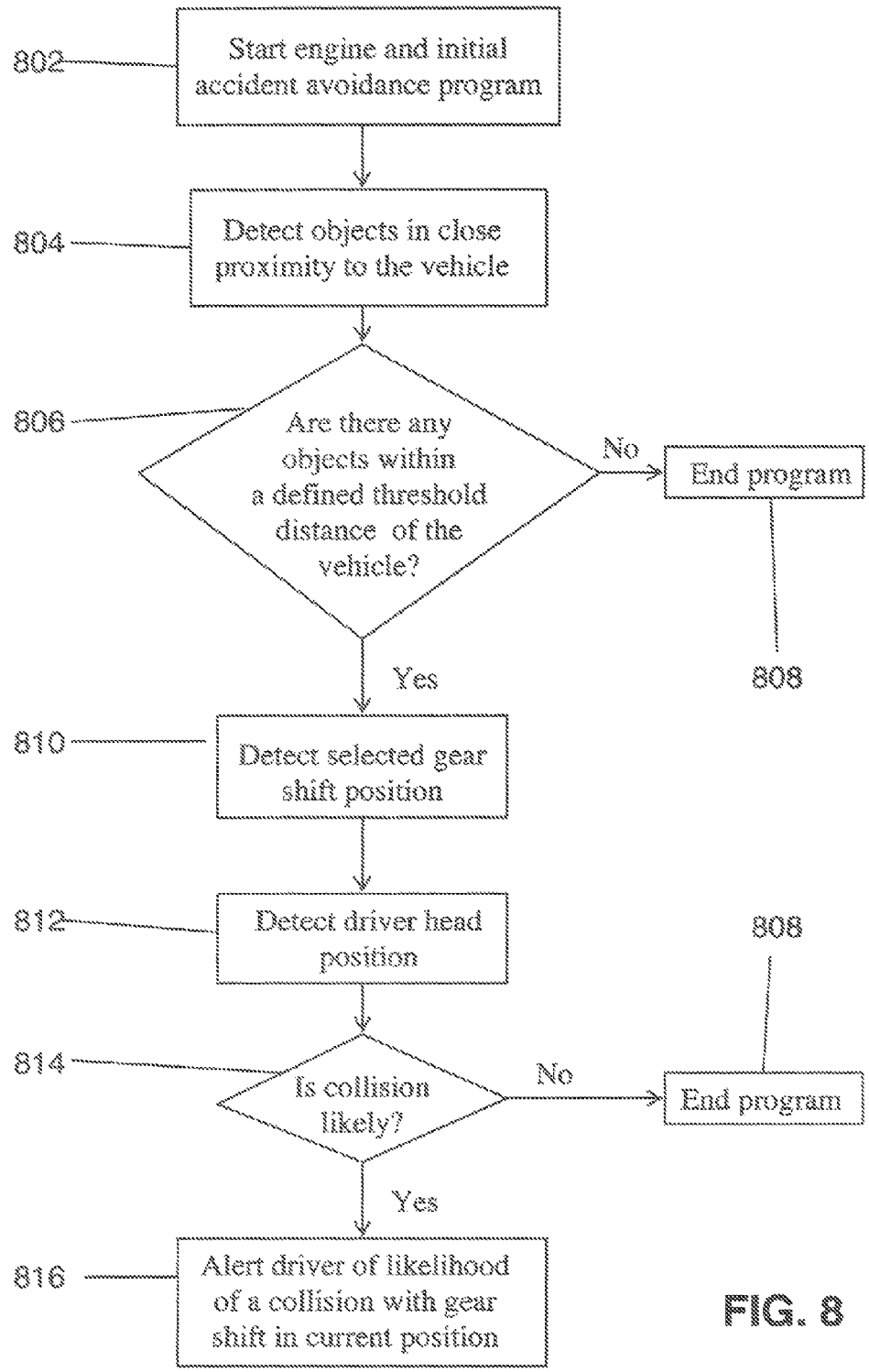

METHOD AND SYSTEM FOR DETECTION OF MOTOR VEHICLE MOVEMENT TO AVOID COLLISIONS

FIELD OF THE INVENTION

This invention relates the detection of unintentional motor vehicle movements and in particular this invention relates to a method and system for detection of a mistakenly positioned gear shift by a driver that results in a driver intending to move the vehicle in one direction but the vehicle is positioned to go in the opposite direction. The present invention relates to the detection of the gear shift position and determines if the gear shift position is consistent with a movement of the vehicle that will avoid an accident or collision of the vehicle with objects in close proximity to the vehicle.

BACKGROUND OF THE INVENTION

Driving a motor vehicle is an integral part of life in our society. People begin driving in their teenage years and many continue driving well into their 80's and 90's. Operating a motor vehicle is a common practice and some of the activities associated with driving are so routine that they can become second nature to a driver. One such activity is maneuvering the gear shift in the vehicle. The gift shift of a vehicle engages the transmission of the vehicle and enables the driver to determine the direction that they want to the vehicle to move.

Today, many drivers perform multiple tasks when occupying the driver's seat. Even if not performing multiple tasks, many drivers become distracted by other events or actions or by their own thoughts. As a result, sometimes drivers do not pay attention to basic, but critical operations of the vehicle. One such operation that is sometimes overlooked is the placement of the gear shift in the appropriate position for the movement of the vehicle. It is not unusual for a driver to unknowingly position the gear shift in a position such that the vehicle is going to move in the opposite direction of the one desired by the driver. For example, the driver may desire for the vehicle move in reverse to back out of a parking spot. However, the driver has unknowingly place the gear shift in the drive position such that the vehicle is going to initially move in the forward direction. As driver presses the accelerator, the vehicle moves forward. If there is something directly in front of the vehicle, there could be a collision before the driver realizes the mistake and stops the vehicle. The same situation would exist if the driver intended to move forward, but mistakenly positioned the gear shift in the reverse position.

A driver mistakenly positioning the gear shift in the wrong position is just one of several safety hazards that can result from operating a motor vehicle. To address some of these hazards and to improve the safety of operating a motor vehicle several innovations have been developed to facilitate motor vehicle safety. For example, U.S. Pat. No. 7,737,866 to Wu, et al, describes an auto-parking device installed on a vehicle comprises a vehicle status sensing unit for detecting a state of a vehicle, an image acquisition unit for capturing vehicle outside image, a range sensing unit for measuring the space, a processing unit for receiving states of the vehicle from the vehicle status sensing unit, receiving environmental states from the image acquisition unit and range sensing unit, calculating a parking path based on parallel parking or back-in parking and then controlling the vehicle steering, throttle and brake via a driving control unit to automatically park the car into the space as per the planned parking path.

U.S. Patent Application No.: 20080023247 to Hall discloses a vehicle having mounted therein a safety system. The safety system may indicate contact between an external object and the vehicle as the vehicle moves in reverse gear. The indication of contact may include automatically shutting down the vehicle engine, engaging the hand braking system of the vehicle, and honking the vehicle horn. The reverse drive safety system for a vehicle may include arms, a sensor cable that may extend between the arms and connect to a sensor spool. The reverse drive safety system additionally may include a sensing device to sense whether an external object has contacted the sensor cable or the arms and may include an electric motor that winds and unwinds the sensor cable based on a signal from the sensing device or a signal from a reverse indicator. The electric motor also may engage and disengage the vehicles hand brake system based on a signal from the sensing device and the reverse indicator. The sensor device additionally may be in communication with an engine kill switch and the vehicle horn.

U.S. Pat. No. 6,909,968 to Yokota describes an arrival detection method for automatically detecting arrival of a current destination based on various conditions and proceeding to route guidance for the next destination when two or more destinations are specified. The method includes the steps of guiding a vehicle of the user to a current destination, detecting whether a current vehicle position is within a predetermined distance from the current destination, applying a primary condition when the vehicle is within the predetermined distance, applying a secondary condition when, the primary condition is met, and determining arrival at the current destination when the secondary condition is met and proceeding to a route guidance operation for the next destination. The primary condition is a time length during which the vehicle is stationary within the predetermined distance from the current destination.

U.S. Patent Application No.: 20060244313 to Sullivan describes an automotive safety system is includes a power window that is automatically lowered a prescribed distance from a fully raised position in response to the car being put into reverse so that the driver may hear outside sounds. According to a second embodiment, the radio system is also turned down when the car is put into reverse.

U.S. Patent Application No.: 20090030611 to Jeong-Shiun Chen discloses a GPS navigation device with a car rear-viewing function is disclosed herein, which includes a monitor, a GPS navigation module receiving a GPS navigation information and providing it to the monitor, a car rear-viewing module providing a car rear image from a camera to the monitor, a switch unit, and a micro control unit. When the shift lever of the car is located in a reverse gear position, the micro control unit sends a switch command to the switch unit to allow the car rear-viewing module to transmit the car rear image to the monitor. In contrast, when the shift lever is not located in the reverse gear position, the monitor is switched to be controlled by the GPS navigation module for displaying the navigation information. Therefore, there is no need to install an additional monitor for displaying the GPS navigation information and the car rear image information, respectively.

In addition to these describes patents and patent applications, other patents including U.S. Pat. Nos. 7,082,359; 5,568,024; 7,991,520; 4,698,571 and 4,643,048 and U.S. published patent application Ser. Nos. 12/293,445; and 11/520,594 describes methods and systems with the intent to address motor vehicle safety issues.

Although there are many innovations that have the intent to address various safety issues related to operating a motor vehicle, none of these innovations directly address the problem associated with a driver mistakenly positioning the gear shift such that the vehicle will move in the opposite direction desired by the driver and thereby increasing the chances of the vehicle colliding with an object or person in the immediate vicinity of the vehicle. There remains a need for a method and system that will detect when the gear shift is positioned such that the vehicle is about to move in the opposite direction to the direction desired by the vehicle driver.

SUMMARY OF THE INVENTION

The present invention provides a method and system to prevent accidental direction selection in a motor vehicle. This invention alerts the driver of the vehicle that the selected direction of the vehicle is opposite of the direction that the driver intends for the vehicle to move. The invention initially detects the selected direction of the vehicle by the driver. The invention then detects the driver's physical position and any objects in the immediate area surrounding the vehicle. Based on the information gathered from these detections, there is determination made regarding the vehicle direction selected by the driver. If the determination is the likelihood of an accident/collision if the vehicle moves in the selected direction, the present invention will alert the driver. In addition, an embodiment of the present invention may also include the ability to disable the vehicle in order to avoid a collision.

As mentioned, the system of the present invention contains sensors that will detect the physical movement/position of the driver and the placement of the gear shift. Sensors will also detect the proximity of objects immediately surrounding the vehicle. A computing device within the vehicle processes the gathered information and produces a determination of the appropriate direction in which the vehicle should move. This system also has a means to alert the driver if the vehicle is about to move in a direction that will substantially increase the likelihood of a collision of the vehicle with a surrounding object.

DETAILED DESCRIPTION OF THE DRAWINGS

FIG. 8 is a flow diagram of the steps in the implementation of an alternate embodiment of the present invention.

DETAILED DESCRIPTION OF THE INVENTION

Figure 1:
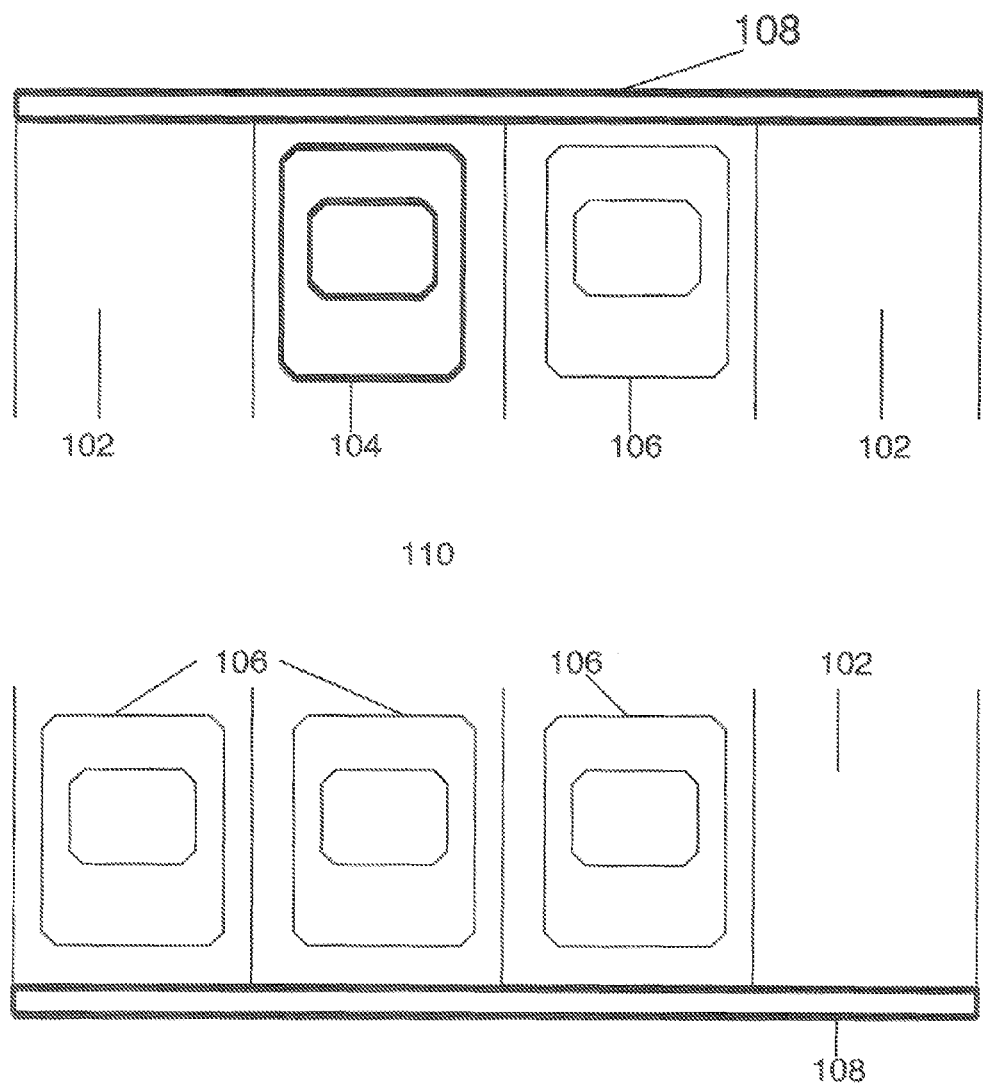
FIG. 1 is a view of a motor vehicle parked forward in a parking lot slot with other objects in close proximity to the parked vehicle.

The present invention provides an accident direction resolution when driving a vehicle. Some existing techniques solve some of the problems related to vehicle safety in order to avoid collisions. For example there are backup camera devices that aid when reversing a vehicle. There are also mechanisms that help auto park a vehicle. But there is not a solution to prevent a vehicle from going forward when the intent is for the vehicle move in a reverse direction. No present technique alerts the driver or prevents vehicle movement when there is a mis-positioning of the gear shift.

The main idea of this invention is to prevent accidental direction selection in a vehicle. When a car is at a dead halt position and the driver of the vehicle wants to reverse the vehicle in a transmission gear system, he or she does so by engaging the gear shift selector by putting it into reverse. However in some instances, he or she accidentally puts the gear into the drive position. The driver is not aware of this mistake and has now turned their head backwards to look in the rear direction of the vehicle. The driver then presses the accelerator of the vehicle and the vehicle moves forwards instead of backwards. Current systems have no warning or other means to alert the driver that this gear selection is wrong. Instead, the vehicle lurches forward. If the vehicle was parked in a parking space close to the sidewalk which was in front of a restaurant whose patrons where sitting at a table in a designated place on that sidewalk next to the curb imagine what could happen to those dining. They could potentially be hit by this vehicle which was intending to reverse but accidentally lurched ahead because of a wrong gear selection.

A main advantage of the present invention over other vehicle safety systems is that this invention uses a predictive algorithm to determine the desired movement of the car which is different from prior arts which have an audible alert or graphical illumination in dash if there is going to be a collision or a camera which provides a picture when reversing the vehicle. One scenario—A car is parked and the driver is ready to back up the car.

Gear in park and prediction algorithm uses known aids to gather information around the car i.e. if there are any obstacles around it and what the distance is between those obstacles and the car.

Gear is accidentally selected to drive instead of reverse, based on the proximity to the obstacles in front of the car, system alerts with audible/graphical alert while applying the brakes and cutting the gas supply to the engine thereby reducing the possibility of engine revving and causing the car to lurch ahead while the accelerator pedal is depressed.

If the gear is selected to reverse, there will be a brake assist such that the car doesn't lurch out while being reversed also aiding in easing the car back into traffic and preventing very common parking lot accidents.

Some current systems have auto-parking capabilities, but falls short of using a predictive algorithm when in reverse or drive selection is done. It only assists the user in auto parking.

FIG. 1 is a view of a motor vehicle 104 parked forward in a parking lot slot with other cars and objects in close proximity to the parked vehicle. A typical parking lot has parking spaces 102 in which cars 104 and 106 park. In this discussion, vehicle 104 is parked front first and faces a parking barrier 108. This barrier 108 can be for instance a wall in a parking garage or it can be a parking stop in an outdoor parking lot. In a parking lot a drive 110 separates rows of parking spaces. In this particular parking configuration, the parking barrier 108 is in close proximity to the front end of the vehicle. Unintended movement of the vehicle in the forward direction could result in a collision with the parking barrier, damage to the vehicle and possible injury to the driver or passengers in the vehicle. Depending on the size of the drive 110 between parking lot rows, there may be sufficient distance between the parking rows to enable to the driver to react to stop vehicle movement in the unintended direction.

Figure 2:
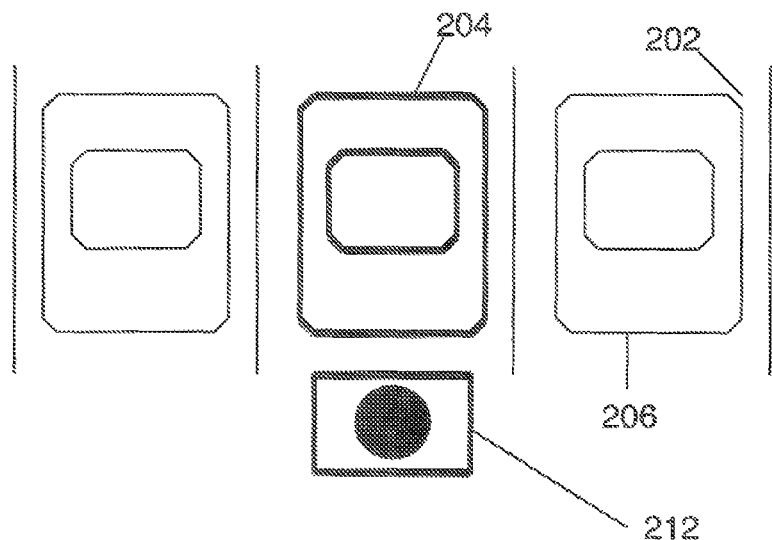
FIG. 2 is a view of a motor vehicle parked with an object in close proximity behind the rear of the vehicle.

FIG. 2 shows a view of a motor 204 backed into a parking space 202. In this configuration an object 212 is directly behind the rear of the parked vehicle 204. In this configuration an unintended movement of the vehicle in the back or reverse direction could cause the vehicle to strike the stationary object 212. The close proximity of the object to the vehicle would make it very difficult to avoid a collision with the stationary object in the event of vehicle movement in the rear direction.

Figure 3:
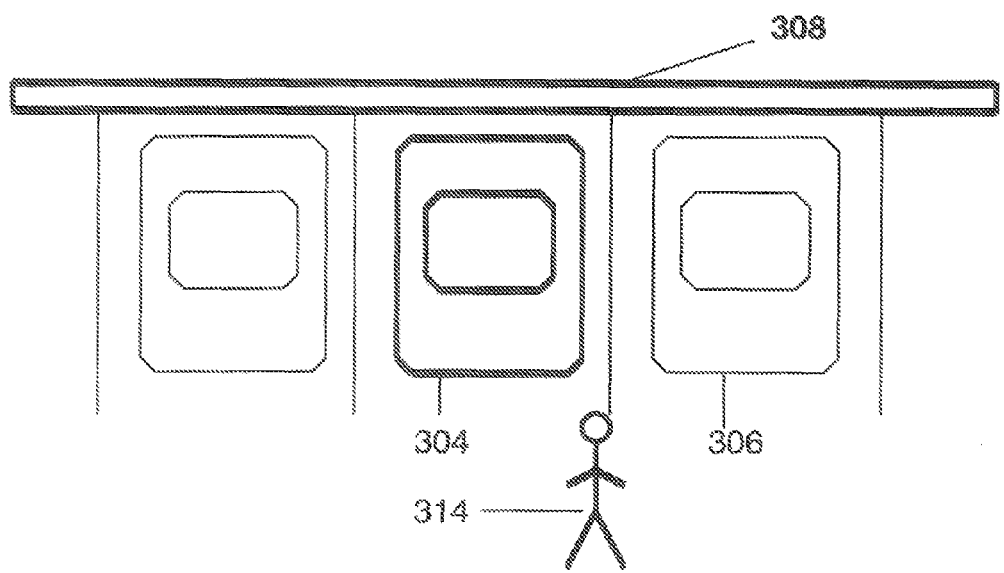
FIG. 3 is a view of a motor vehicle parked with a pedestrian approaching in close proximity to the rear of the vehicle.

FIG. 3 shows a view similar to FIG. 1 in that the motor vehicle 304 is parked forward in a parking lot slot. In this configuration, a parking barrier 308 is in front of the vehicle. The rear of the vehicle is clear of objects and there appears to be space in back the car out of the parking slot. In this configuration, a pedestrian 314 is approaching the parking slot occupied by the vehicle. Although, the driver may intend to back the vehicle out of the parking lot slot, because of the approaching pedestrian, the driver may not want to move the in the reverse direction in order to avoid a possible collision with the pedestrian 314. In any of the described configurations in FIG. 1, 2 or 3, it is desirable to be able to alert the driver to conditions surrounding the vehicle and the position of the gear shift in order to avoid potential vehicle collisions.

Figure 4:
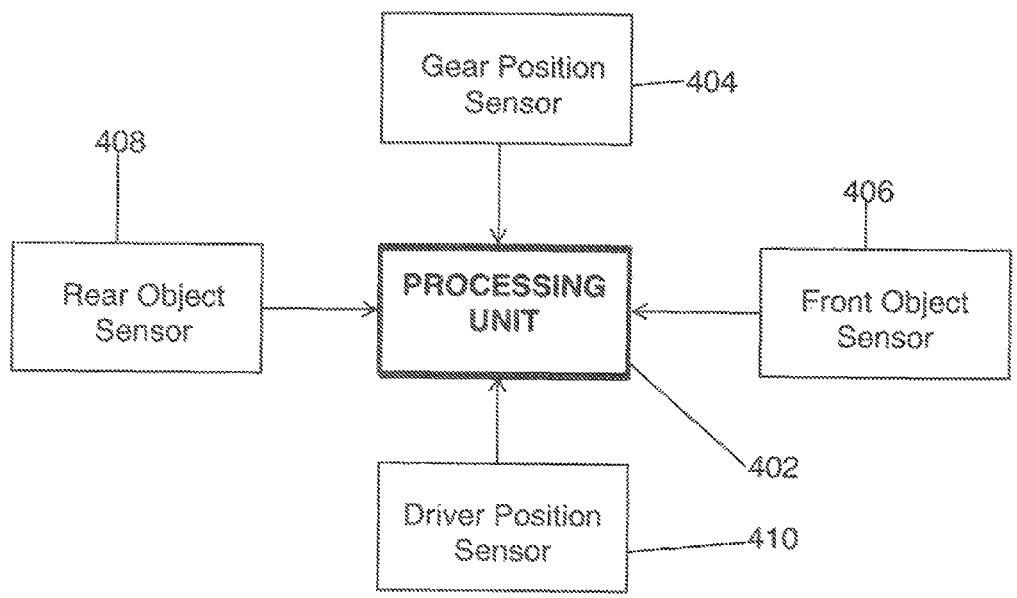
FIG. 4 is a diagram of a configuration of the present invention in which a processing unit gathers and processes information from sensors positioned at various locations on the motor vehicle.

FIG. 4 shows the main components in the system of the present invention. The system comprises a central processing unit 402 located in the motor vehicle. This processing unit could be one currently installed in many motor vehicles. As an alternate, this processing unit could also be standalone unit specifically dedicated to the prevention of potential collisions as set forth in this invention. This system also has various sensors that are in communication with the central processing unit and have the capability to transmit information to the central processing unit. This set of sensors includes gear position sensor 404 that will detect when the driver puts the transmission into a gear for vehicle movement. This sensor could be positioned in the vehicle similar to the current means that indicates to the driver the gear of the transmission. In fact that same means that indicates the current gear to the driver can serve as the sensor 404 that will submit the gear information to the processing unit 402. Another sensor in this configuration is a front end or forward movement sensor 406. The objective of this sensor is to identify objects positioned at distances in the front of the car. Conventional detection techniques such as sonar or sound can be implemented to detect objects and the distance of such detected objects from the front of the vehicle. Also infrared technology can be implemented to detect the location of objects in close proximity to the vehicle. In this implementation, there can be a threshold distance for the detection of relevant objects. For example, a threshold distance of 15 feet would cause the sensors 406 to detect objects that are within 15 feet of the front of the vehicle. This threshold distance can be set and changed as desired. Third sensor is a rear detection sensor 408. Similar to the front forward movement sensor 406, this sensor 408 detects objects in the rear of the vehicle. The same threshold distance would apply for detecting objects in close proximity to the vehicle. The fourth sensor is a driver position sensor 410. This sensor has the capability to detect the position of the driver immediately prior to the vehicle movement. For example, this sensor can detect if the driver is in a forward looking position when the gear shift position is in the drive position. One implementation of the driver position sensor is to use retina detection technology to determine if the driver is looking in the forward direction. Another driver position technique to determine if the driver is looking in the forward direction is to detect the head orientation of the driver using cameras. With any detection technique, this sensor can be calibrated to a set of standard driver positions. The sensor would detect the driver position and transmit that information to the processing unit 402. In operation, the processing unit would receive information from each of the sensors 404, 406, 408 and 410. The central processor will process this information as will be described herein. Depending on the result of from the processing, the processing unit many send out an alert to the driver or some signal that could disable the vehicle.

Figure 5:
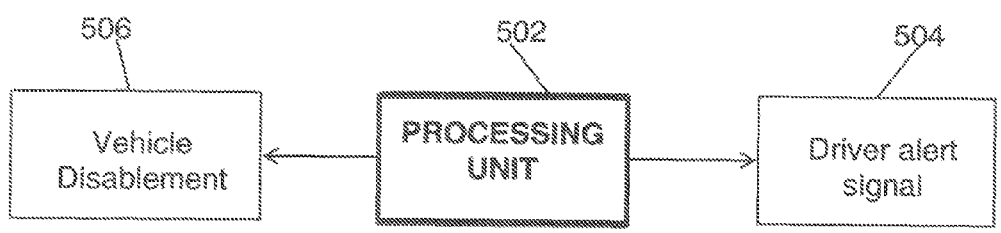
FIG. 5 is a diagram of a configuration of the present invention in which a processing unit transmits commands to various components of the vehicle in response to a determination of the proximity of an object to the vehicle.

Referring to FIG. 5, shown is the configuration of the transmission of information from the processing unit 502 to the driver or the motor vehicle. As mentioned, once the processing unit completes processing the information received from the sensors, if necessary, the processing unit can send out an alert signal 504 to the driver. This signal can an audible signal to get the driver's attention and cause the driver recognize that the vehicle is in the incorrect gear for the movement that the driver anticipates. Signal 506 sent from the processing unit can affect the operation of the vehicle. One possible effect is to cause the vehicle to vibrate. The vibration would alert the driver. This vibration would be similar to vehicle vibration when a vehicle runs over ridges or grooves on highway shoulders that alert the driver to the fact that they have left the highway and are now on the shoulder. The driver would then steer the vehicle back onto the highway.

The processing units can contain a computer program product that will implement the method of the present invention. Referring to Figure, shown is a flow diagram of the steps in the general method of the present invention. Step 602 initializes the process. This initialization step can be activated by starting the vehicle engine. Once the method is initialized, the sensing actions begin in step 604. In this step, sensors 406 and 408 detect objects within a threshold distance from the vehicle. If the sensors detect any objects within this threshold distance, this information is transmitted to the processing unit 402. If no objects are detected within the threshold distance, one option would be to conclude that there no real likelihood of a collision. In this case, the method could terminate. Still another approach could be to send information to the processing unit that no objects are within the threshold distance. In step 606, the gear position sensor 404 detects the position of the gear once the driver has repositioned the gear out of the park position. Actually steps 604 and 606 can occur simultaneously. As with the forward and rear sensors, information from the gear position sensor is sent to the processing unit. Step 608 detects the driver's position. As mentioned, one technique to detect the driver's position is to detect the driver's retinas. Using existing position detection technology, this sensor can detect the driver's position and transmit this information to the processing unit. Once the processing unit receives all of the information from the sensors, in step 610 the processor determines whether there is a likelihood of an immediate collision. This determination could be based on predetermined combinations of conditions. For example, a set of conditions could be:

1) the front sensor detects an object within the threshold distance to the vehicle;
2) the driver positions the gear shift in the reverse position; and
3) the driver's position is looking toward the rear.

This set of conditions would suggest that the driver has correctly positioned the vehicle to move in the appropriate direction to avoid a collision. For this set of conditions, no alert would be sent to the driver. A second set of conditions could be:

1) the rear sensor detects an object within the threshold distance to the vehicle;
2) the driver positions the gear shift in the reverse position; and
3) the driver's position is looking toward the rear.

In this situation, the driver is looking in the rear direction and the conclusion can be that the driver intends to move the vehicle in the rear direction in spite of the fact that an object is detected in the rear of the vehicle. Even though the driver is looking in the proper direction, the driver may not be able to see the detected object. It may be below the driver line of site, but still could cause a collision with the vehicle. The response for this set of conditions could be to alert the driver that an object is detected in the rear of the vehicle. In practice, these predetermined conditions could be stored in the memory of the processing unit.

Figure 6:
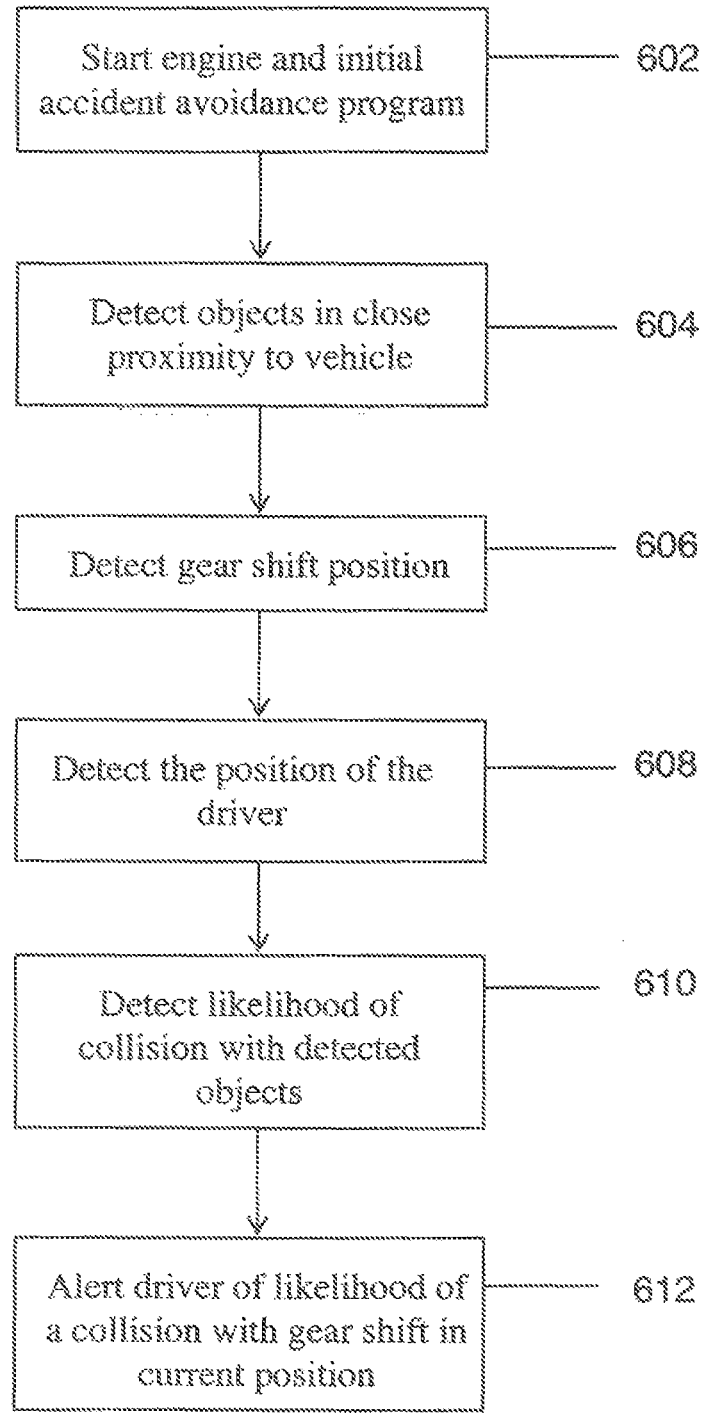
FIG. 6 is a flow diagram of the general steps in the implementation of the method of the present invention.
Figure 7:
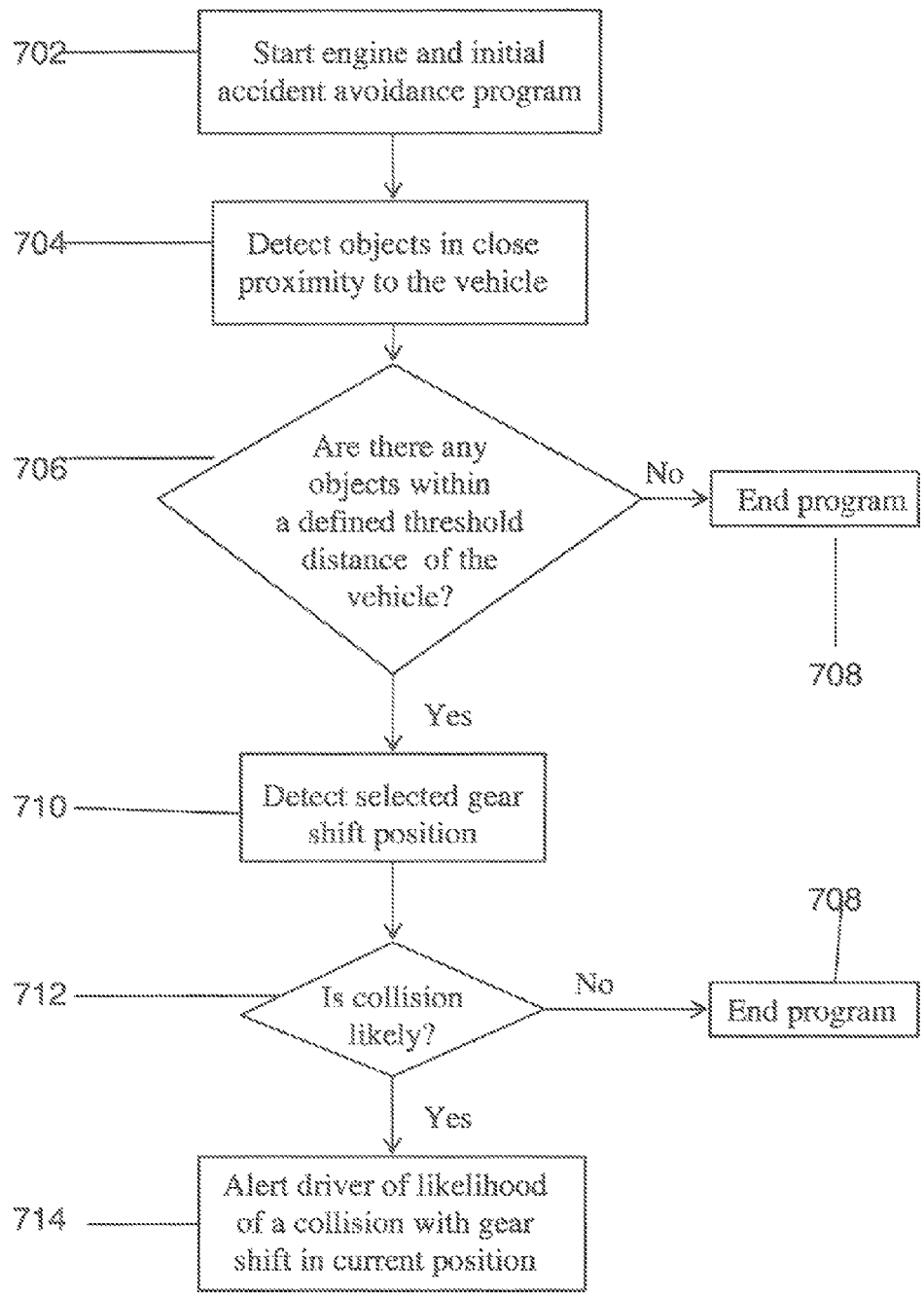
FIG. 7 is a flow diagram of the specific steps in the implementation of an embodiment of the present invention.

FIG. 7 shows a more detailed flow diagram of the steps in the method of the present invention. Similar to FIG. 6, the initial step 702 initializes the program upon the start of the vehicle engine. This initialization step also activates the vehicle sensors. In step 704, the front and rear vehicle sensors detect any objects within close proximity (the threshold distance) to the vehicle. After the object detection step, in step 706, there is a determination of whether there are any objects within the threshold distance of the vehicle. This determination in step 706 can be made at the processing unit after it receives the information from the sensors. If there are no objects within the threshold distance, the conclusion can be that there is no likelihood of a collision and the method can terminate in step 708: The rationale could be that if there are no objects in the immediate vicinity of the vehicle, the driver can realize any error and take appropriate action before there is an accident.

If the determination in step 706 is that there is one or more objects within the threshold distance of the vehicle, step 710 detects the selected gear position. This information is also sent to the processing unit. Using this information and the information regarding the detection of objects within the threshold distance, step 712 determines if there is a likelihood of confusion. If the conclusion is that there is no likelihood of confusion, again the process can terminate in step 708. If there is a conclusion of the likelihood of a collision, step 714 alerts the driver of the condition. As mention, the driver alert could be some audible or visual message or some effect on the vehicle. Again as in FIG. 6, the likelihood of a collision can be based on sets or combinations of predetermined conditions. Meeting certain predetermined conditions equals a likelihood of a collision condition that will cause the driver to be alerted.

In the invention description to this point, the gear position detection and the detection of objects in the vicinity of the vehicle are sufficient to determine the likelihood that the driver has mistakenly position the gear in the incorrect position. However, as previously discussed, the position of the driver can also be a factor in determining whether the driver his placed the gear shift in the wrong position to move in the direction desired by the driver. Referring to FIG. 8, this flow diagram of steps is similar to FIG. 7 with the exception that the detection of the driver's position is incorporated into this embodiment. In this method, steps 802, 804, 806, 808, 810 are similar to steps 702, 704, 706, 708 and 710 respectively. In FIG. 8, following the detection of the gear shift position in step 810, step 812 detects the position of the driver as previously mentioned. Step 814 then makes a determination as to whether the driver has correctly positioned the gear shift such that the vehicle will move in the direction desired by the driver. In the event, the conclusion is that the gear position is incorrect for movement of the vehicle in the direction desired by the driver. In this case, step 816 will alert the driver as previously described. The driver alert could also be in the form of physically affecting the operation of the motor vehicle. The physical affect could be the automatic application of brakes to stop the vehicle from moving.

It is important to note that while the present invention has been described in the context of embodiments for implementing vehicle accident avoidance and vehicle safety, those skilled in the art will appreciate that the components and processes of the present invention are capable of being distributed in the form of instructions in a computer readable storage medium and a variety of other forms, regardless of the particular type of medium used to carry out the distribution. The method of this invention provides significant advantages over the current art. The invention has been described in connection with its preferred embodiments. However, it is not limited thereto. Changes, variations and modifications to the basic design may be made without departing from the inventive concepts in this invention. In addition, these changes, variations and modifications would be obvious to those skilled in the art having the benefit of the foregoing teachings. All such changes, variations and modifications are intended to be within the scope of this invention.

I claim:

1. A system for detection of potential immediate movement of a motor vehicle to avoid an accidental collision comprising:
    a processing unit positioned in a motor vehicle, said processing unit capable of transmitting and receiving information related to internal and external conditions of the motor vehicle;
    front end detection sensors positioned on the motor vehicle such that said front end sensors can detect objects in front of the motor vehicle within a predetermined threshold distance from the motor vehicle, said front end detection sensors capable of transmitting information to the processing unit;
    rear end detection sensors positioned on the motor vehicle such that said rear end sensors can detect objects behind the motor vehicle within a predetermined threshold distance from the motor vehicle, said rear end detection sensors capable of transmitting information to the processing unit;
    a gear shift detector capable of detecting gear shift changes and indicating a current gear of the motor vehicle, said gear shift detector capable of transmitting information to the processing unit;
    a driver position detector capable of detecting whether a driver is facing forward in a motor vehicle; and
    a processing module contained in said processing unit, said processing module capable of receiving information from said front end detection sensors, said rear end detection sensors and said gear shift detector, said processing module also capable of determining a direction of a potential immediate movement of the motor vehicle based on the information received from said front end, rear end and gear shift detectors and said processing module capable of determining whether the determined direction of a potential immediate movement of the vehicle can result in an immediate collision with a detected object.

2. The system for detection of potential immediate movement of a motor vehicle as described in claim 1 wherein said driver position detector capable of detecting whether a driver is facing forward in a motor vehicle further comprises a driver retina detector.

3. The system for detection of potential immediate movement of a motor vehicle as described in claim 1 wherein said driver position detector capable of detecting whether a driver is facing forward in a motor vehicle further comprises a driver head orientation detector.

4. The system for detection of potential immediate movement of a motor vehicle as described in claim 1 further comprising a driver alert indicator to alert the driver of a potential collision if the vehicle moves in the determined direction based on the detected gear shift position and detected objects positioned in close proximity to the front end or rear end of the motor vehicle.

5. The system for detection of potential immediate movement of a motor vehicle as described in claim 4 wherein said driver alert indicator is an audible sound.

6. The system for detection of potential immediate movement of a motor vehicle as described in claim 4 wherein said driver alert indicator is a vibration of the motor vehicle.

7. The system for detection of potential immediate movement of a motor vehicle as described in claim 4 wherein said driver alert indicator is a disabling of movement of the motor vehicle.

8. The system for detection of potential immediate movement of a motor vehicle as described in claim 4 wherein said driver alert indicator is a visual indicator.

9. The system for detection of a potential immediate movement of a motor vehicle as described in claim 1 wherein said front end detectors and said rear end detectors use infrared beams to detect objects.

10. The system for detection of a potential immediate movement of a motor vehicle as described in claim 1 wherein said front end detectors and said rear end detectors use projected sound to detect objects.

11. The system for detection of a potential immediate movement of a motor vehicle as described in claim 1 wherein said processing module comprises a software module.

12. A method for detection of potential immediate movement of a motor vehicle to avoid an accidental collision comprising:
- initializing a processing unit containing a processing module at the initiation of a motor vehicle engine;
- determining a threshold distance for detection objects in proximity of the motor vehicle;
- detecting objects within the distance from the motor vehicle;
- detecting a position of a gear shift in the motor vehicle;
- detecting a driver position and whether a driver is facing forward in a motor vehicle;
- transmitting data related to detection of objects and related to the gear shift position to the processing unit; and
- determining a direction of a potential immediate movement of the motor vehicle based on the information received from said front end, said rear end, said gear shift detectors and said processing module capable of determining whether the determined direction of a potential immediate movement of the vehicle can result in an immediate collision with a detected object.

13. The method as described in claim 12 further comprising after said direction determining of potential immediate movement of the motor vehicle alerting a driver of an immediate potential collision with an object within the threshold distance of the motor vehicle.

14. The method as described in claim 13 wherein said driver alerting comprises an audible alert to the driver.

15. The method as described in claim 13 wherein said driver alerting comprises physically affecting the motor vehicle to alert the driver.

16. The method as described in claim 15 wherein said physically affecting the motor vehicle further comprises automatically applying vehicle brakes to physically affect the motor vehicle.

17. The method as described in claim 12 wherein said object detecting further comprises determining if an object is within the threshold distance from the motor vehicle.

\* \* \* \* \*